(12) United States Patent
Jägle et al.

(10) Patent No.: US 11,679,364 B2
(45) Date of Patent: Jun. 20, 2023

(54) MIXING OR DISPERSING DEVICE AND MIXING OR DISPERSING ASSEMBLY

(71) Applicant: IKA—WERKE GMBH & CO. KG, Staufen (DE)

(72) Inventors: Peter Jägle, Ballrechten-Dottingen (DE); Axel Kaufmann, Neuenburg (DE)

(73) Assignee: IKA—WERKE GMBH & CO. KG, Staufen (DE)

( * ) Notice: Subject to any disclaimer, the term of this patent is extended or adjusted under 35 U.S.C. 154(b) by 1173 days.

(21) Appl. No.: 16/323,217

(22) PCT Filed: Aug. 1, 2017

(86) PCT No.: PCT/EP2017/000930
§ 371 (c)(1),
(2) Date: Feb. 4, 2019

(87) PCT Pub. No.: WO2018/024371
PCT Pub. Date: Feb. 8, 2018

(65) Prior Publication Data
US 2020/0179884 A1    Jun. 11, 2020

(30) Foreign Application Priority Data
Aug. 5, 2016 (DE) ..................... 10 2016 009 478.8

(51) Int. Cl.
*B01F 27/00* (2022.01)
*B01F 27/88* (2022.01)
(Continued)

(52) U.S. Cl.
CPC ............ *B01F 27/88* (2022.01); *B01F 27/172* (2022.01); *B01F 27/808* (2022.01); *B01F 35/31* (2022.01);
(Continued)

(58) Field of Classification Search
CPC ........ B01F 27/88; B01F 35/31; B01F 27/172; B01F 2101/22
See application file for complete search history.

(56) References Cited

U.S. PATENT DOCUMENTS

| 2,278,125 A | 3/1942 | Landgraf |
| 2,284,155 A * | 5/1942 | Landgraf .............. A47J 43/046 |
| | | 366/205 |

(Continued)

FOREIGN PATENT DOCUMENTS

| CN | 201290615 Y | 8/2009 |
| CN | 201669071 U | 12/2010 |
| EP | 2939578 A1 | 11/2015 |

OTHER PUBLICATIONS

International Search Report from PCT Application No. PCT/EP2017/000930, dated Jan. 22, 2018.

*Primary Examiner* — Anshu Bhatia
(74) *Attorney, Agent, or Firm* — Budzyn IP Law, LLC

(57) ABSTRACT

The mixing or dispersing device and assembly equipped with such a device are proposed for optimizing the processing of mixed or dispersed substances, in particular tablets and/or capsules for medicinal drugs. The mixing or dispersing device includes in a mixing chamber, a motor-driven rotor having at least one cutting projection that has at least one cutting edge. A flow-disturbing element is further provided on an inner circumferential wall of the mixing chamber that surrounds the axis of rotation. Furthermore, a deflection surface is provided between the inner circumferential wall and a bottom of the mixing chamber. The at least one flow-disturbing element is spaced from the bottom of the mixing chamber, from the at least one cutting projection and from the circular path on which the at least one cutting projection is movable about the axis of rotation.

25 Claims, 4 Drawing Sheets

(51) Int. Cl.
  *B01F 27/172*   (2022.01)
  *B01F 27/808*   (2022.01)
  *B01F 35/31*    (2022.01)
  *B01F 35/53*    (2022.01)
  *B01F 101/22*   (2022.01)

(52) U.S. Cl.
  CPC ...... *B01F 35/5312* (2022.01); *B01F 2101/22* (2022.01)

(56) References Cited

U.S. PATENT DOCUMENTS

| | | |
|---|---|---|
| 2,757,909 A | 8/1956 | Wayne |
| 5,323,973 A | 6/1994 | Ferrara |
| 6,616,324 B1 | 9/2003 | Planca et al. |
| 2006/0245298 A1* | 11/2006 | Jagle ............... B01F 27/88 366/244 |
| 2008/0212403 A1* | 9/2008 | Garman ........... A47J 43/0727 366/205 |
| 2016/0129409 A1* | 5/2016 | Drees ............. A47J 43/0722 366/241 |

* cited by examiner

MIXING OR DISPERSING DEVICE AND MIXING OR DISPERSING ASSEMBLY

FIELD OF THE INVENTION

The invention relates to a mixing or dispersing device, in particular specified for comminuting tablets and/or medicament capsules and for dissolving the comminuted tablets and/or medicament capsules in a liquid, having a vessel that has a mixing space, having a rotor that in the mixing space is drivable about a rotation axis, and having a transmission element that is capable of is coupled or is coupled to a drive, for transmitting a drive torque from the drive to the rotor.

The invention furthermore also relates to a mixing or dispersing assembly having a drive unit that has a drive, and having at least one mixing or dispersing device that is capable of being coupled or is coupled to the drive.

BACKGROUND OF THE INVENTION

Mixing or dispersing devices and mixing or dispersing assemblies of this type are already known in various embodiments in practice. Said mixing or dispersing devices and mixing or dispersing assemblies are used, for example, for dissolving medical active ingredients in a liquid. To this end, tablets and/or medicament capsules conjointly with a liquid are incorporated in the mixing space of a vessel of said mixing or dispersing devices. The tablets and/or medicament capsules with the aid of a rotor that has blades are then comminuted and mixed with the liquid and optionally dissolved in the liquid.

However, in particular in the case of medicament capsules, it can arise herein that said medicament capsules float in or on the liquid and make their way into the effective range of the rotor only with difficulty or in some circumstances not at all, and therefore cannot be comminuted in the desired manner. In the case of tablets which contain an active ingredient that is difficult to dissolve, it is often necessary for said tablets to be initially comminuted in a particularly fine manner so as to be able to accelerate the dissolving process. However, in the case of the mixing or dispersing devices known from the prior art, this is not always achieved within an acceptable period of time.

SUMMARY OF THE INVENTION

It is therefore an object of the invention to achieve a mixing or dispersing device and a mixing or dispersing arrangement of the type mentioned at the outset by way of which mixing or dispersing material to be comminuted, in particular tablets and/or medicament capsules, can be very reliably comminuted and when required also dissolved in a liquid.

This object in the case of a mixing or dispersing device of the type mentioned at the outset is achieved by the means and features of claim 1. According to the invention, a mixing or dispersing device in which the rotor has at least one cutting protrusion which is directed away from a base of the mixing space and angled toward the rotation axis and has at least one blade is proposed. By way of a cutting protrusion that is configured in such a manner and which can protrude from below upward into the mixing space, for example, mixing or dispersing material to be comminuted, in particular tablets and/or medicament capsules, can make its/their way very reliably into the effective range of the at least one cutting protrusion that rotates about the rotation axis and be comminuted with the aid of the at least one blade. The gravity that acts on the mixing or dispersing material to be comminuted can be utilized herein. Said gravity counteracts any potential buoyancy arising herein and can convey the mixing or dispersing material to be comminuted in the direction of the at least one cutting protrusion where said mixing or dispersing material to be comminuted can hit the at least one blade and be comminuted by the latter. The special alignment of the cutting protrusion facilitates the comminution of the material. The risk of the mixing or dispersing material to be comminuted hitting and bouncing off the rotor by virtue of the movement of the latter without being comminuted can be minimized. The at least one cutting protrusion herein can be disposed on an arm of the rotor and have a defined radial spacing from the rotation axis of the rotor.

In the case of the mixing or dispersing device it is furthermore proposed according to the invention that at least one flow breaker is provided, in particular disposed or configured, on an internal circumferential wall of the mixing space that surrounds the rotation axis and is oriented so as to be transverse or orthogonal in relation to the base, in such a manner that a spacing of a first end of the flow breaker that faces the base from the rotation axis is smaller than a spacing of a second end of the flow breaker that faces away from the first end from the rotation axis. This at least one flow breaker, by way of the special geometry thereof that in the profile of said flow breaker tapers from the first end of said flow breaker toward the second end of said flow breaker, causes the configuration of a donut that is particularly advantageous for the mixing or dispersing task in a liquid located in the mixing space as soon as the rotor, which can also be referred to as the mixing or dispersing tool, is set in motion. A donut in the context of the invention is understood to be the flow pattern that is generated by the driven rotor on the liquid surface of a liquid located in the mixing space.

This donut by virtue of the at least one flow breaker can advantageously extend right down to the rotor such that mixing or dispersing material floating in the liquid, in particular tablets and/or medicament capsules, can make its/their way into the region of the cutting protrusion and be comminuted.

The special design of the at least one flow breaker on the internal circumferential wall of the mixing space enables the configuration of the afore-described donut shape even in the case of rotor drive concepts only a comparatively small drive torque can be transmitted to the rotor. An energy requirement of the mixing or dispersing device for reliably comminuting and dissolving mixing or dispersing material by means of the at least one flow breaker can therefore be reduced.

A further feature that is substantial to the invention lies in that a deflection face which is specified for deflecting mixing or dispersing material to be processed and liquid in the direction of the rotor and of the at least one cutting protrusion is configured between the internal circumferential wall and the base of the mixing space. The deflection space herein has a profile that is oblique in relation to the base and to the internal circumferential wall of the mixing space. This deflection face causes a return flow of mixing or dispersing material to be comminuted and liquid in the direction of the rotor. Mixing or dispersing material to be comminuted and/or a liquid, by virtue of the rotation of the rotor in the operation of the mixing or dispersing device, is transported radially outward from the rotation axis to the internal circumferential wall of the mixing space. The transported mixing or dispersing material and/or the liquid, or a mixture thereof, can impact the deflection face there and, by virtue of the oblique profile of the latter, can be conveyed back in the direction of the rotor and of the at least one cutting protrusion, where the mixing or dispersing material transported in the liquid can again be caught by the cutting protrusion and be further comminuted with the aid of the at least one blade. In the most favorable case a toroidal material flow can be formed herein which facilitates a particularly fine comminution of mixing or dispersing material and a particularly rapid dissolution of the mixing or dispersing material, in particular of the tablets and/or medicament capsules.

It is furthermore provided according to the invention that the first end of the at least one flow breaker is spaced apart from the base of the mixing space and from a circular path on which the at least one cutting protrusion is movable. In other words, the first end of the at least one flow breaker can have an, in particular axial, spacing from the base of the mixing space, a spacing from the at least one cutting protrusion, and a spacing from the circular path on which the at least one cutting protrusion is movable. The at least one flow breaker thus has a sufficient distance from the base as well as from the at least one cutting protrusion so as to prevent mixing or dispersing material, in particular tablets and/or medicament capsules, can cant between the at least one flow breaker and the base or the at least one cutting protrusion, which could interfere with the operation of the mixing or dispersing device or interrupt said operation, or even damage the mixing or dispersing device.

A circular path in the context of the present invention herein can be understood to be the path on which a point of the at least one cutting protrusion revolves about the rotation axis in the case of a rotating rotor, said point having a maximum spacing from the rotation axis of the rotor.

A further advantage of the mixing or dispersing device according to the invention can lie in that, by virtue of the construction of said mixing or dispersing device according to the invention, comparatively little drive energy has to be transmitted to the rotor in order to be able to achieve the desired mixing or dispersing results in the case of said mixing or dispersing device according to the invention. In particular, the special design of the at least one flow breaker and the disposal thereof on the internal circumferential wall of the mixing space are particularly relevant in this context. Said special design of the at least one flow breaker and the disposal thereof on the internal circumferential wall of the mixing space specifically allow an energetically particularly favorable donut flow which can facilitate a swift comminution and optionally also a dissolution of the mixing or dispersing material in the liquid to be configured. This applies even when only a comparatively weak drive is available, or a restriction of the permissible torque is to be considered.

It can furthermore be advantageous for the rotor to have two, three, or four, or more cutting protrusions of the type described above. The cutting protrusions herein can in each case be disposed on a dedicated arm of the rotor and be, optionally dissimilarly, spaced apart from the rotation axis of the rotor.

A particularly stable donut can be formed when the mixing or dispersing device has two, three, or four, or more flow breakers of the type described above that are disposed so as to be preferably uniformly distributed about the rotation axis.

In order for the afore-described donut to be formed, it can be furthermore advantageous for the at least one flow breaker to be a web which protrudes into the mixing space and runs in the direction of the rotation axis, in particular so as to be parallel with the latter. The web herein can have a rectangular, or at least in portions round, cross section. As has already been indicated above, the at least one flow breaker can have a geometry which tapers, in particular in a conical manner, from the first end toward the second end.

The at least one flow breaker that tapers in a conical manner herein can restrict the formation of the donut in a predetermined manner. Without the flow breaker, a donut of maximum size would result which would lead to the mixing or dispersing material, thus particles to be comminuted, by virtue of the centrifugal force bearing on the internal circumferential wall of the mixing space and circulating thereon without however making its way into the effective range of the at least one cutting protrusion. If the at least one flow breaker were to be provided having a straight profile that deviates from the conical profile, an excessively small donut would be formed. Which then under certain circumstances would no longer reach into the effective range of the at least one cutting protrusion. This could lead to the particles to be comminuted no longer being able to be comminuted, in particular when said particles have a density that is lower than that of the liquid in the mixing space and float on the surface of the donut.

When the first end of the at least one flow breaker is bent, in particular along a radius, a flow being formed can also be deflected in the direction of the rotor with the aid of the bent first end of the at least one flow breaker. The function of the deflection face in the transition region between the base and the internal circumferential wall of the mixing space can thus be supported and an even better mixing or dispersing result can be achieved.

In the case of one embodiment of the invention the at least one flow breaker can be a separate part. However, it is particularly advantageous for the at least one flow breaker, conjointly with the internal circumferential wall of the mixing space, to form a materially homogenous monolithic unit. The at least one flow breaker can thus be connected to the vessel in an integral manner and be captively disposed on the vessel.

The at least one cutting protrusion in relation to the rotation axis can be aligned at an arbitrary angle between 0 degrees and 90 degrees, and herein point upward from the base of the mixing space. The at least one cutting protrusion in relation to the rotation axis can preferably be disposed at an angle of five degrees, or else in relation to a cross-sectional plane that is oriented so as to be orthogonal to the rotation axis and/or in relation to the base of the mixing space of the vessel can be disposed at an angle of 85 degrees. When the at least one cutting protrusion in relation to the rotation axis is disposed or aligned at an angle of five degrees, and in relation to the cross-sectional plane defined above or in relation to the base of the mixing space of the vessel is disposed or aligned at an angle of 85 degrees, this can have advantages in the production of the rotor.

When the at least one cutting protrusion is produced by bending a free end of an arm of the rotor, it can be advantageous for reasons of bending technology for the at least one cutting protrusion in relation to a base of the vessel or to a cross-sectional plane that is oriented so as to be orthogonal to the rotation axis to be aligned at said angle of 85 degrees, or in relation to the rotation axis to be aligned at an angle of five degrees.

The mixing or dispersing material to be comminuted, by virtue of the in particular roller-type flow that forms within the mixing space, can thus be transported from above onto the at least one cutting protrusion and be reliably caught and comminuted by the at least one blade. The effect of the blade on the mixing or dispersing material can be particularly positive when the at least one blade is aligned so as to be transverse or orthogonal to the rotation axis.

In order for the desired flow conditions within the mixing space to be generated, it can be advantageous for the deflection face between the internal circumferential wall and the base of the mixing space, said internal circumferential wall and the mixing space being connected to one another by the deflection face, to have a bent profile. The deflection face herein can be bent along a radius across a specific angular range of, for example, 90 degrees. It can be moreover advantageous for the deflection face to form a closed uninterrupted ring about the rotation axis. This ring can fill a transition region between the base and the internal circumferential wall of the mixing space, and contribute toward the formation of a particularly stable and uniform flow, in particular a toroidal flow.

In order to be able to effectively avoid any blocking of the rotor within the mixing space by virtue of particles to be processed, it can be advantageous for a minimum axial spacing of the at least one flow breaker from the base of the mixing space, a minimum spacing of the at least one flow breaker from the at least one cutting protrusion, and/or a minimum spacing of the at least one flow breaker from the circular path of the at least one cutting protrusion to be at least as large as a maximum dimension of particles, in particular of tablets and/or medicament capsules, that are to be processed by the mixing or dispersing device.

A minimum axial spacing of the at least one flow breaker from the base of the mixing space, a minimum spacing of the at least one flow breaker from the at least one cutting protrusion, and also a minimum spacing of the at least one flow breaker from the circular path of the at least one cutting protrusion can thus be adapted to a maximum dimension of particles, in particular of tablets and/or medicament capsules, that are to be processed by the mixing or dispersing device. This means that the spacings defined above in this instance are at least as large as said maximum dimension.

Positive results can be achieved when a minimum axial spacing of the at least one flow breaker from the base of the mixing space corresponds to at least one fifth, one quarter, one third, half, two thirds, three quarters, nine tenths of a radius of the rotor, or to at least the length of the radius of the rotor. However, it is also possible for the minimum axial spacing of the at least one flow breaker from the base of the mixing space to be larger than the radius and smaller than the diameter of the rotor. The spacing can thus have a length which is between the length of the radius and the length of the diameter of the rotor.

It can furthermore be advantageous for a minimum spacing of the at least one flow breaker from the at least one cutting protrusion to correspond to at least one fifth, one quarter, one third, half, two thirds, three quarters, nine tenths of the radius of the rotor, or to at least the length of the radius of the rotor. However, it is also possible for the minimum spacing of the at least one flow breaker from the at least one cutting protrusion to be larger than the radius and smaller than the diameter of the rotor. Said spacing can thus have a length which is between the length of the radius and the length of the diameter of the rotor.

It can moreover be favorable for a minimum spacing of the at least one flow breaker from the circular path to correspond to at least one fifth, one quarter, one third, half, two thirds, three quarters, nine tenths of the radius of the rotor, or to at least the length of the radius of the rotor. However, it is also possible for the minimum spacing of the at least one flow breaker from the circular path of the at least one cutting protrusion to be larger than the radius and smaller than the diameter of the rotor. Said spacing can thus have a length which is between the length of the radius and the length of the diameter of the rotor.

For a simpler and, if required, even automated handling of the mixing or dispersing device according to the invention, it can be advantageous for the vessel to have a closure wall that is opposite the base of the mixing space, an interface for a handling unit being provided on the external side of said closure wall that faces away from the mixing space. The mixing or dispersing device according to the invention can thus be handled by means of a handling unit that is adapted to the interface.

Moreover, a closure wall, for example that closure wall that has already been mentioned above, that is opposite the base of the mixing space can have a filler opening. Mixing or dispersing material, or else a liquid or other additives, can be supplied to the mixing space through said filler opening when required. The filler opening can advantageously be assigned a lid by way of which the filler opening can be closed.

In this context, it can be advantageous for the filler opening to be surrounded by a threaded connector which has a thread. When the lid in this instance is provided with a thread that matches the former, the filler opening can be particularly reliably closed by screwing the lid onto the connector or the threaded connector.

In the case of one further embodiment of the invention it can be provided that the vessel on the lower side thereof that in the use position faces a drive has at least one support foot. The mixing or dispersing device can thus be placed on a surface when required, without easily tilting.

Furthermore, the vessel on the lower side thereof that in the use position faces a drive can have a bayonet coupling. It is thus possible for the mixing or dispersing device according to the invention to be reliably connected to a drive unit which has a corresponding counter-coupling.

It can be expedient herein for an interface, for example the interface already mentioned above, for a handling unit to be disposed on an external side of a closure wall, for example the closure wall already mentioned above, of the vessel that faces away from the base, so as to be in a defined alignment in relation to the at least one support foot and/or the bayonet coupling.

It is thus possible for the mixing or dispersing device with the aid of a handling unit to be transferred in an automated manner in a specific and well-defined orientation to a processing station or a drive unit, in order to be coupled to the bayonet coupling. The relative position between the interface and the at least one support foot and/or the bayonet coupling can in this instance function as an encoding, with the help of which the mixing or dispersing device when acquired by a handling unit in the context of automated handling and transfer of the mixing or dispersing device according to invention, is aligned in a position optimized for a transfer.

A drive concept of the mixing or dispersing device according to the invention can provide that the transmission element is a rod-shaped element which is held by a diaphragm forming at least part of an internal wall of the vessel. Said element by means of a drive can be set in a gyrating motion such that a rod end of the rod-shaped element that protrudes into the mixing space performs a gyrating motion. The rod-shaped element herein, in particular by way of the rod end thereof, can engage in a clearance of the rotor so as to set the rotor in a rotating motion by way of the own gyrating motion of said rod end.

In the case of another drive concept according to the invention it is provided that the transmission element is a drive shaft which is drivable by means of a drive and which is routed through a rotary leadthrough into the mixing space. The rotor is connected to said drive shaft in a rotationally fixed manner and in the event of a rotation of the drive shaft can likewise be set in rotation.

For comminuting and/or processing tablets and/or the medicament capsules it can be particularly advantageous for the first end of the at least one flow breaker to have an axial spacing from the circular path on which the at least one cutting protrusion revolves in the operation of the mixing or dispersing device. A void which is sufficiently large so as to avoid any jamming of a tablet and/or a medicament capsule between the rotor and the first end of the at least one flow breaker can be achieved in this way between the first end of the at least one flow breaker and the circular path on which the at least one cutting protrusion revolves in the operation of the mixing or dispersing device. Moreover, said axial spacing between the first end of the at least one flow breaker and the circular path can facilitate the formation of a return flow of a mixture of liquid and solids located in the latter, in particular parts of medicament capsules and/or tablets, in a cutting region of the rotor that is defined by the circular path. Overall, thorough and reliable comminuting and dissolving of tablets and/or medical capsules can thus be performed in a liquid.

It is furthermore possible for the rotor to be disposed, in particular axially, thus in relation to the rotation axis of the rotor, between the base of the mixing space and the first end of the at least one flow breaker. This disposal of the rotor, in particular relative to the first end of the at least one flow breaker, can reduce the risk of a medicament capsule and/or a tablet being jammed between the rotor, by way of the at least one cutting protrusion of the latter, and the at least one flow breaker.

In this context it can be particularly preferable for the first end of the at least one flow breaker to be disposed above the circular path on which the at least one cutting protrusion of the rotor revolves in the operation of the mixing or dispersing device. This disposal is meaningful above all in the case of vessels that are used upright, and can prevent any jamming of medicament capsules and/or tablets between the rotor and the at least one flow breaker. This applies above all in conjunction with a corresponding axial spacing of the first end of the at least one flow breaker from the circular path. The axial spacing between the first end of the at least one flow breaker and the circular path of the at least one cutting protrusion and/or the at least one blade of the rotor herein can be adapted to a maximum dimension of particles, in particular of tablets and/or medicament capsules, that are to be processed by the mixing or dispersing device. In particular, the axial spacing between the first end of the at least one flow breaker and the circular path of the at least one cutting protrusion and/or the at least one blade can be larger than such a maximum dimension of particles to be processed.

In the case of one embodiment of the mixing or dispersing device an, in particular radial, spacing between the deflection face and the rotation axis of the rotor can be larger than an, in particular radial, spacing between the first end and the rotation axis of the rotor. In this way, the deflection face can be disposed so as to be recessed in comparison to the first end of the at least one flow breaker. This disposal of the deflection face relative to the first end of the at least one flow breaker can facilitate the formation of a stable and above all targeted return flow of the liquid and of the solids located therein back to the effective range of the rotor. Overall, tablets and/or a medicament capsules can thus not only be comminuted more rapidly, but also be dissolved in the liquid within a shorter time.

The object mentioned further above is also achieved by a mixing or dispersing assembly having the means and features of the independent claim pertaining thereto. In particular, according to the invention a mixing or dispersing assembly having a drive unit that has a drive, and having at least one mixing or dispersing device according to the invention that is capable of being coupled or is coupled to the drive is proposed.

BRIEF DESCRIPTION OF THE DRAWINGS

An exemplary embodiment of the invention is described in more detail hereunder by means of the drawing. In the drawing, in part in a schematic illustration.

DETAILED DESCRIPTION OF THE INVENTION

Figure 1:
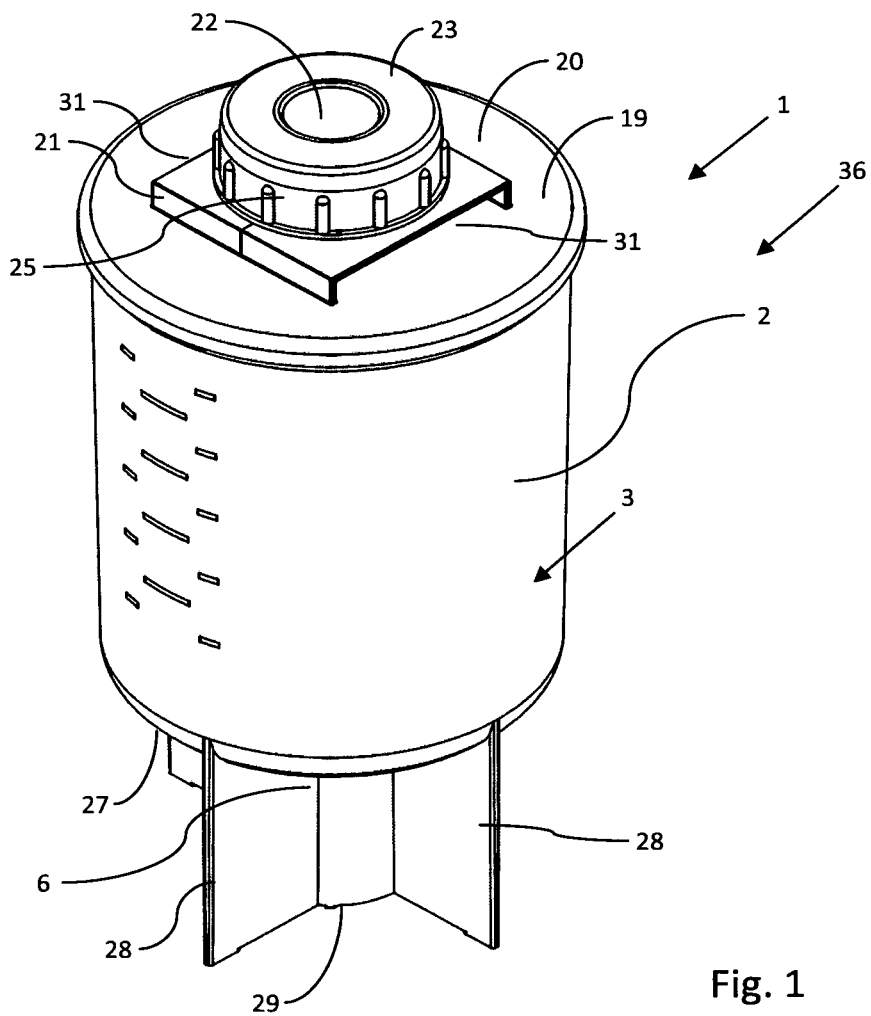
FIG. 1 shows a perspective view of a mixing or dispersing device according to the invention.
Figure 2:
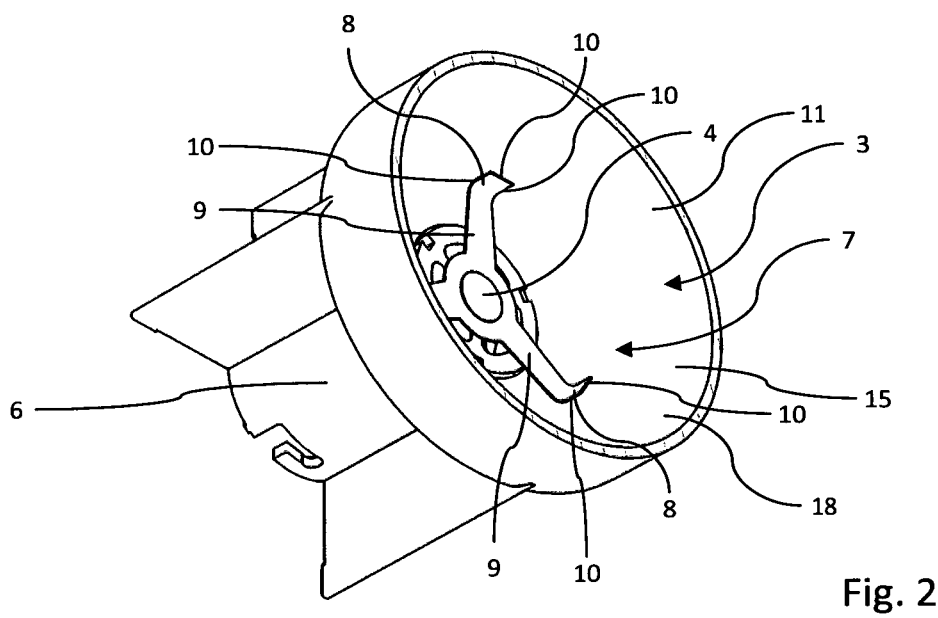
FIG. 2 shows a cross-sectional perspective view of a pedestal of the mixing or dispersing device illustrated in FIG. 1, wherein the cross-section lies below the first ends of flow breakers that are disposed within the mixing space.
Figure 3:
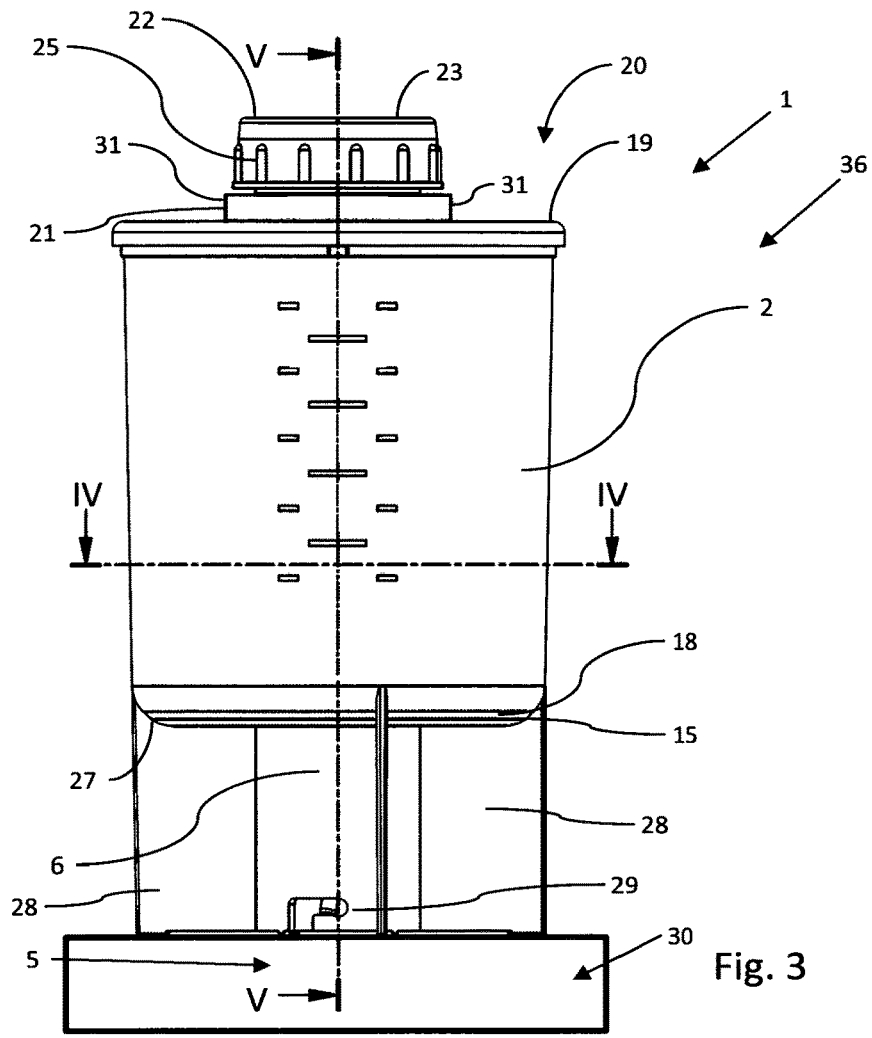
FIG. 3 shows a side view of the mixing or dispersing device illustrated in FIGS. 1 and 2.

FIGS. 1 to 7 show various views of a mixing or dispersing device that overall is identified by the reference sign 1. Said mixing or dispersing device is specified for efficiently comminuting tablets and/or medicament capsules and thereafter to dissolve said tablets and/or medicament capsules in a liquid.

The mixing or dispersing device 1 has a vessel 2 having a mixing space 3 located therein. A rotor 4 that is drivable about a rotation axis R is disposed in the mixing space 3. Said rotor 4 can generally be referred to as a mixing or dispersing tool and serves for comminuting mixing or dispersing material that is filled into the mixing space 3 and for blending said mixing or dispersing material with a liquid that is likewise filled into the mixing space 3, or even for dissolving said mixing or dispersing material in said liquid.

The mixing or dispersing device 1 furthermore has a transmission element 6 that is capable of being coupled to a drive 5 (only very schematically illustrated in the figures) and in the use position is coupled to said drive 5. The transmission element 6 serves for transmitting a drive torque from the drive 5 to the rotor 4.

As is highlighted in particular in FIGS. 2, 4, 5, 6, and 7, the rotor 4 has a total of three cutting protrusions 8 which are directed away from a base 7 of the mixing space 3 and are angled toward the rotation axis R. Each of the three cutting protrusions 8 herein is disposed on a free end of one of the total of three arms 9 of the star-shaped rotor 4. Each of the three cutting protrusions 8 on each of the three free external edges thereof has in each case one blade 10 by way of which mixing or dispersing material, in particular tablets and/or medicament capsules, that is/are filled into the mixing space 3 can be comminuted as soon as the rotor 4 is driven.

Figure 4:
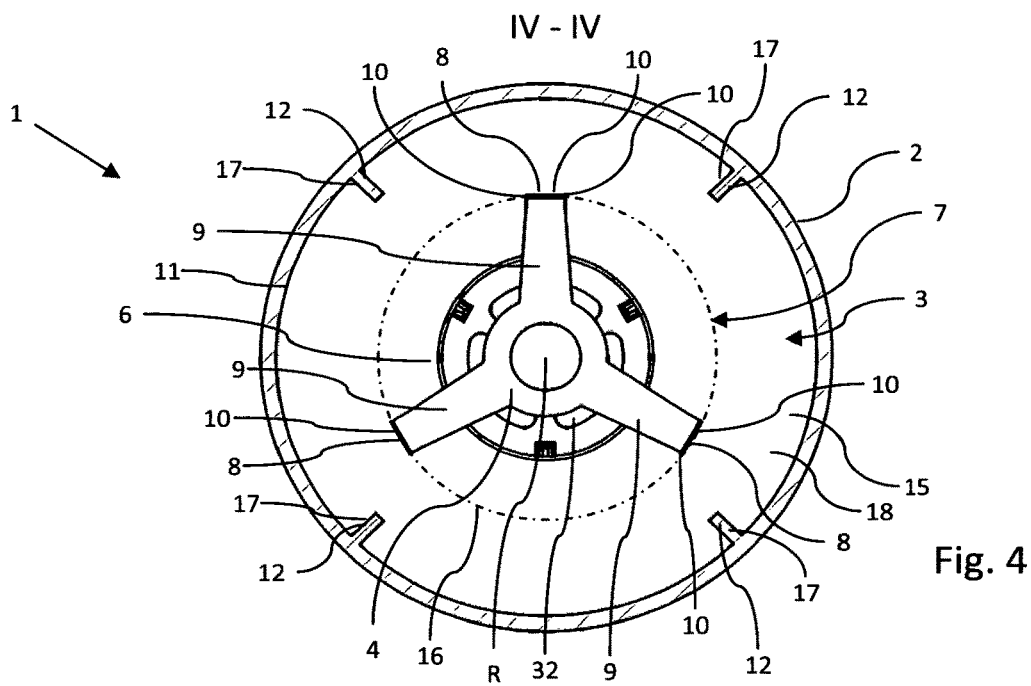
FIG. 4 shows a sectional plan view along the line IV-IV illustrated in FIG. 3 of the mixing or dispersing device illustrated in FIGS. 1 to 3.
Figure 6:
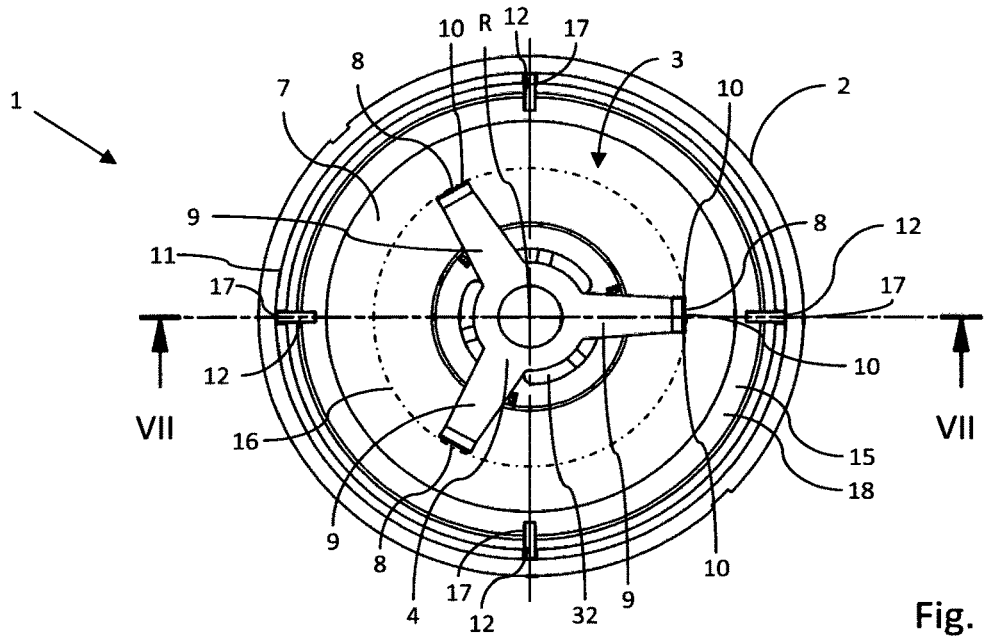
FIG. 6 shows a further plan view of the mixing or dispersing device illustrated in FIGS. 1 to 5, wherein a star-shaped rotor having three arms can be seen as a mixing or dispersing tool in the mixing space of the mixing or dispersing device, in each case one cutting protrusion that protrudes orthogonally from the drawing plane being configured on the free ends of said three arms.

According to FIGS. 4 and 6, a total of four flow breakers 12 that are disposed so as to be uniformly distributed about the rotation axis R are provided on an internal circumferential wall 11 of the mixing space 3, said internal circumferential wall 11 being oriented so as to be transverse or orthogonal, respectively, in relation to the base 7. Said flow breakers 12 herein are configured in such a manner that spacings of first ends 13 of the flow breakers 12 that face the base 7 of the mixing space 3 from the rotation axis R are smaller than spacings of second ends 14 of the flow breakers 12 that face away from the first ends 13 from the rotation axis R. This special design embodiment of the flow breakers 12 serves for generating an energetically optimized flow in the form of a donut that reaches up to the rotor 4 in the use of the mixing or dispersing device 1.

Furthermore, a deflection face 15 for deflecting mixing or dispersing material to be processed and/or a liquid in the direction of the rotor 4 and of the total of three cutting protrusions 8 is configured between the internal circumferential wall 11 and the base 7 of the mixing space 3. Said deflection face 15 can be particularly readily seen in the sectional illustrations of the mixing or dispersing device 1 according to FIGS. 5 and 7.

The deflection face 15 herein has a profile that is oblique in relation to the base 7 as well as to the internal circumferential wall 11, such that a material flow composed of mixing or dispersing material and liquid impacting on the deflection face 15 is deflected in the desired manner and is transported back into the effective range of the rotor 4 and the cutting protrusions 8 of the latter. The material flow in the direction of the deflection face 15 is initiated by the rotating rotor 4.

The sectional illustrations of the mixing or dispersing device 1 further highlight in particular that the first lower end 13 of each of the four flow breakers 12 has an axial spacing from the base 7 of the mixing space 3, an axial spacing from the rotor 4, and above all from the cutting protrusions 8 of said rotor 4, as well as a spacing from a circular path 16 on which the total of three cutting protrusions 8 are moved when the rotor 4 is set in motion.

The total of four flow breakers 12 that protrude into the mixing space 3 are configured as webs 17 which on the internal circumferential wall 11 of the mixing space 3 run in the direction of the rotation axis R. The webs 17 herein at least in portions have rectangular cross sections. As has already been explained above, and can be seen in particular by means of FIGS. 5 and 6, each of the four flow breakers 12 has a geometry that tapers from the first end 13 toward the second end 14. In other words, this means that a spacing of a surface or side of each of the flow breakers 12 that faces the rotation axis R from the internal circumferential wall 11 that surrounds the respective flow breaker 12, is reduced in the profile of the respective flow breaker 12 from the first end 13 toward the second end 14. The four flow breakers 12 in the region of the lower first ends 13 thereof thus have a smaller mutual spacing than at the upper second ends 14 thereof.

The figures clearly show that the first ends 13 of the flow breakers 12 are bent along a radius. It can furthermore be seen by means of the sectional side view according to FIG. 7 of the mixing or dispersing device 1 according to the invention that the flow breakers 12 are integrally connected to the internal circumferential wall 11 of the mixing space 3. This means that the flow breakers 12 conjointly with the internal circumferential wall 11 of the mixing space 3 form a materially homogenous monolithic unit.

According to FIGS. 2, 4, 5, 6 and 7, the cutting protrusions 8 in relation to the base 7 of the mixing space 3 are aligned at an angle of 90°, and in relation to a cross-sectional plane that is oriented so as to be orthogonal to the rotation axis R are aligned at an angle of 90°, and in relation to the rotation axis R are aligned at an angle of 0° and thus so as to be parallel with the rotation axis R of the rotor 4. At least the upper blades 10 of the cutting protrusions 8 herein are aligned so as to be orthogonal to the rotation axis R and are disposed in a common cutting plane. The remaining lateral blades 10 of the cutting protrusions 8 are at a right angle in relation to the base 7 of the mixing space 3 and are therefore at least in portions aligned so as to be parallel with the rotation axis R.

The deflection face 15 between the internal circumferential wall 11 and the base 7 of the mixing space 3, the two latter being connected by said internal circumferential wall 11, has a bent profile along a radius across an angular range of 90°, and forms a closed uninterrupted ring 18 about the rotation axis R.

A minimum axial spacing of the flow breakers 12 from the base 7 of the mixing space 3, a minimum spacing of the flow breakers 12 from the cutting protrusions, and also a minimum spacing of the flow breakers 12 from the circular path 16 of the blades 10 is adapted to a maximum dimension of particles, in particular of tablets and/or medicament capsules, that are to be processed by the mixing or dispersing device 1. This means that the spacings defined above are at least as large as said largest dimension.

The minimum spacing of the flow breakers 12 from the base 7 of the mixing space 3 in the exemplary embodiment of the mixing or dispersing device 1 according to the invention illustrated in the figures is approximately 95% of the radius of the rotor 4. The radius of the rotor 4 here is understood to be the spacing of those points of the rotor 4 that are the most remote from the rotation axis R, or of the cutting protrusions 8, from the rotation axis R.

In the case of an exemplary embodiment (not illustrated in the figures) of the mixing or dispersing device 1 the minimum spacing of the flow breakers 12 can also be larger than the radius of the rotor. The spacing can thus be chosen so as to be larger than the radius but smaller than the diameter of the rotor 4.

Figure 7:
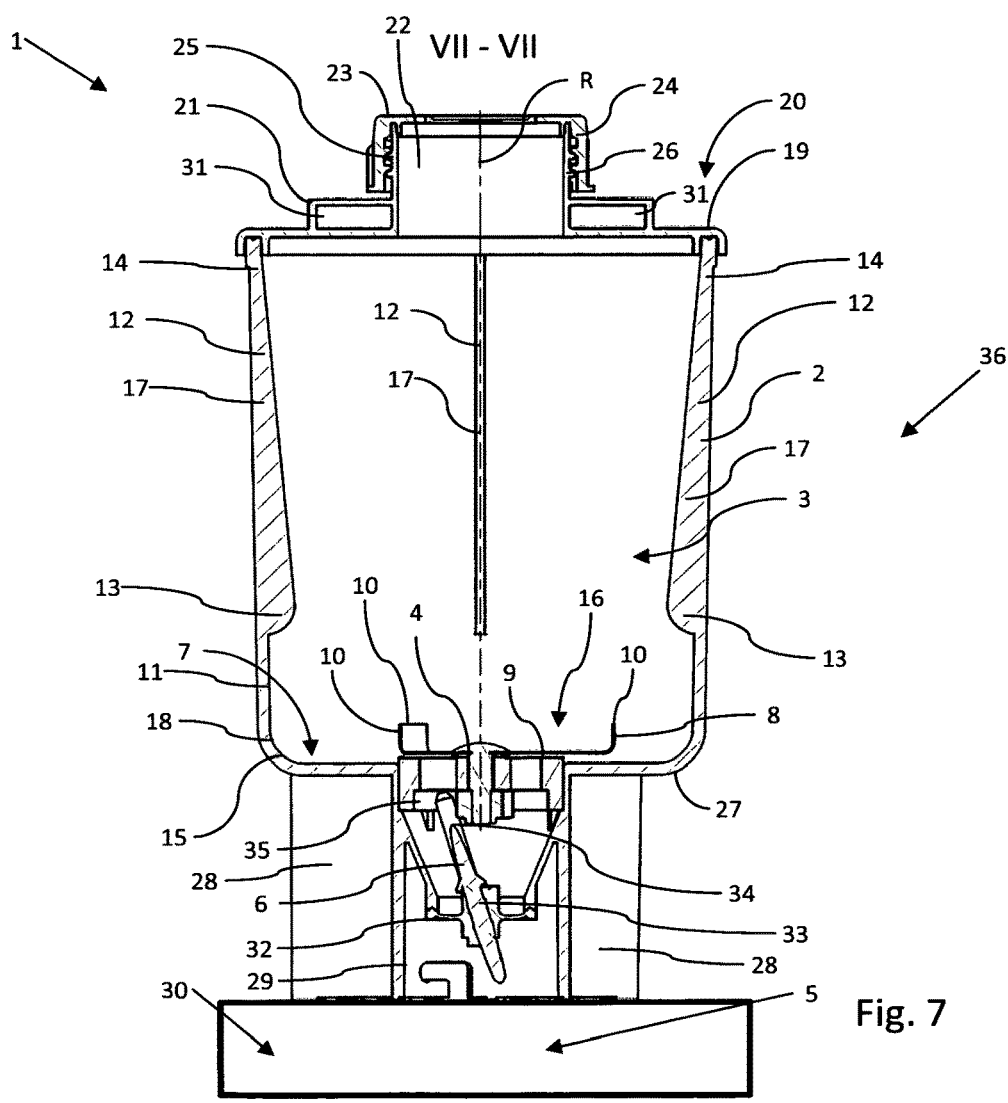
FIG. 7 shows a sectional side view along the line VII-VII illustrated in FIG. 6 of the mixing or dispersing device illustrated in the preceding figures, wherein three of a total of four flow breakers protruding into the mixing space can be seen, wherein all of the flow breakers are disposed on an internal circumferential wall of the mixing space so as to be spaced apart from a base of the mixing space and have a geometry that in the profile thereof tapers from bottom to top such that said flow breakers at the first lower end thereof protrude farther into the mixing space than at the second upper end thereof.

The minimum spacing of the flow breakers 12 from the cutting protrusions 8 and from the upper blades 10, such as can be seen in the right half of FIG. 7, is approximately 90% of the radius of the rotor 4. This minimum spacing herein also corresponds to the spacing of the flow breakers 12 from the circular path 16 on which the blades 10 and the cutting protrusions 8 are moved about the rotation axis R in the case of a driven rotor 4.

The minimum spacing of the flow breakers 12 from the cutting protrusions 8 and from the upper blades 10 can however also be chosen so as to be larger than the radius of the rotor 4. It is possible for the spacing of the flow breakers 12 from the cutting protrusions 8 and from the upper blades 10 to be larger than the radius but smaller than the diameter of the rotor 4.

The vessel 2 has a closure wall 19 that is disposed so as to be opposite the base 7 of the mixing space 3. An interface 21, on which a handling unit (not illustrated in the figures) can grip the mixing or dispersing device 1, is provided on an external side 20 of the closure wall 19 that faces away from the mixing space 3.

A filler opening 22 into the mixing space 3 through which the mixing or dispersing material, further substances, or else liquids, can be introduced into the mixing space 3 is moreover configured in the closure wall 19. The filler opening 22 can be closed by means of a lid 23. To this end, an internal thread 24 by way of which the lid 23 can be screwed onto a threaded connector 25 of the closure wall 19, said threaded connector 25 in turn having an external thread 26, on the upper external side 20 of the closure wall 19 is configured on the lid 23. The vessel 2 on the lower side 27 thereof that in the use position faces the drive 5 has four support feet 28 which are disposed so as to be distributed uniformly about the rotation axis R. The support feet 28 on the lower side 27 of the vessel 2 herein surround a bayonet coupling 29 by means of which the mixing or dispersing device 1 is fixable to a drive unit 30 having the drive 5.

The interface 21 for the handling unit herein is disposed on the external side 20 of the closure wall 19 of the vessel 2 that faces away from the base 7 so as to be in a defined alignment both in relation to the four support feet 20 as well as to the bayonet coupling 29. As is shown in particular in FIG. 1, the interface 21 has two engagement points 31 which are disposed so as to be mutually opposite, into which the gripping elements of a handling unit can be introduced so as to grip the mixing or dispersing device 1. By way of the alignment of the interface 21 and of the engagement points 31 thereof relative to the support feet 28 and the bayonet coupling 29 it is unequivocally defined and encoded, so to speak, how the mixing or dispersing device 1 that is gripped by a handling unit has to be aligned relative to the drive unit 30 and to a coupling interface that is configured so as to match the bayonet coupling 29, in order for the mixing or dispersing device 1 to be placed in an automated manner onto the drive unit 30 and to be connected to the latter.

The transmission element 6 in the exemplary embodiment of the mixing or dispersing device 1 illustrated in the figures is a rod-shaped element 33 that is held by a diaphragm 32. The diaphragm 32 forms a lower part of an internal wall of the vessel 2, in the present case part of the base 7 that closes the mixing space 3 toward the bottom. The rod-shaped element 33 by means of the drive 5 is set in a gyrating motion. This is so that a rod end 34 that protrudes into the mixing space 3 performs a gyrating motion. The rod-shaped element 33 by way of the rod end 34 thereof engages in a clearance 35 of the rotor 4 and can transmit the gyrating motion of said rod end 34 to the rotor 4, on account of which said rotor 4 is set in rotation about the rotation axis 4.

Figure 5:
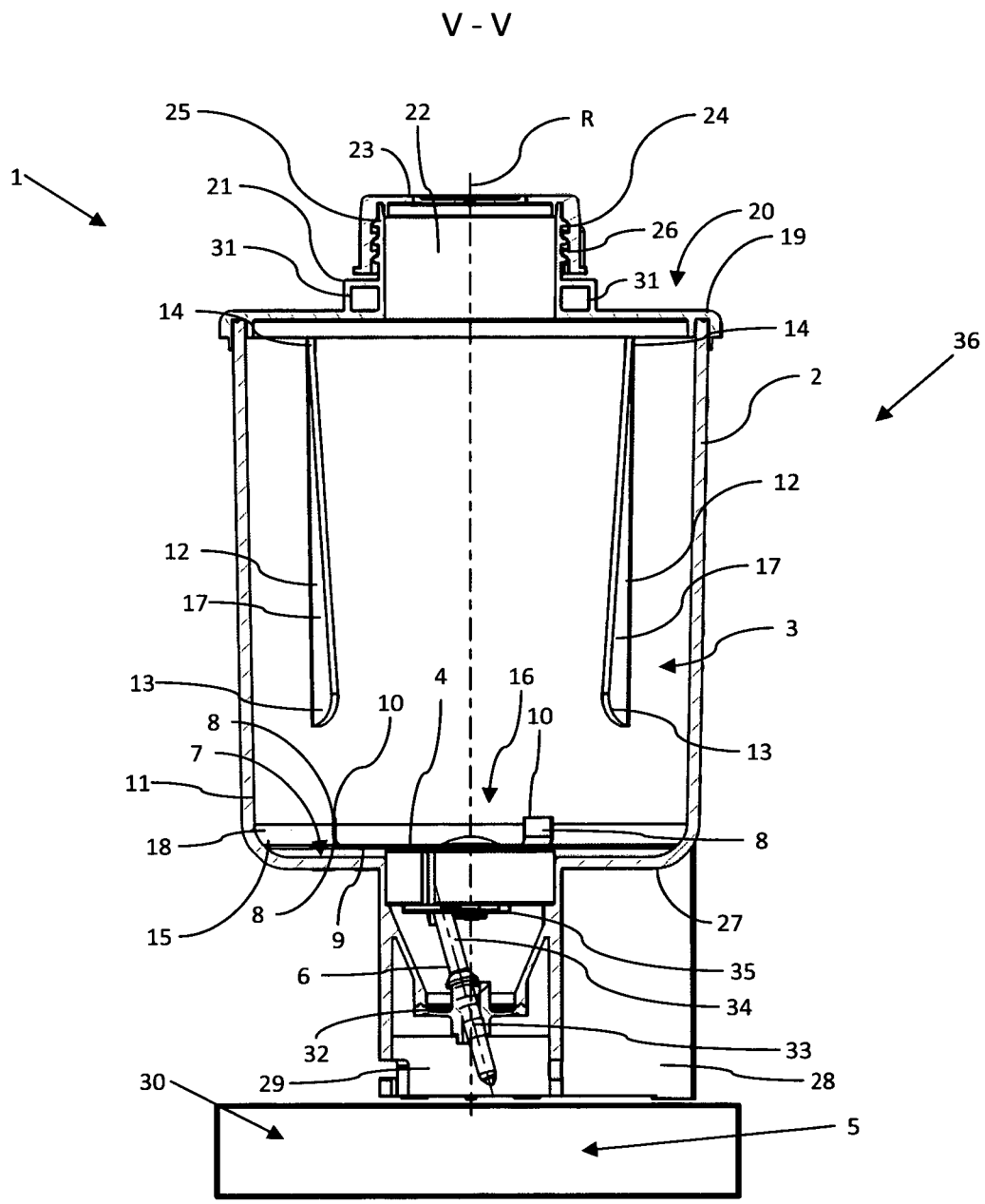
FIG. 5 shows a sectional side view along the line V-V illustrated in FIG. 4 of the mixing or dispersing device illustrated in FIGS. 1 to 4.

FIG. 5 clearly shows that the first ends 13 of the flow breakers 12 have an axial spacing from the circular path 16 and moreover are disposed above the circular path 16. The rotor 4 herein is disposed so as to be axially between the base 7 of the mixing space 3 and the first ends 13 of the flow breakers 12. A void which is sufficiently large for avoiding any jamming of an as yet non-comminuted capsule or tablet between the rotor 4 by way of the cutting protrusions 8 thereof and the first ends 13 of the flow breakers 12 is thus achieved between the first ends 13 and the circular path 16.

In order for a stable return flow of the liquid in the mixing space 3 of the vessel 2 back to the rotor 4 having the cutting protrusions 8 thereof to be formed, a radial spacing between the deflection face 15 and the rotation axis R of the rotor 4 is larger than a radial spacing between the first ends 13 of the flow breakers 12 and the rotation axis R of the rotor 4. The deflection face 15 is thus disposed so as to be recessed in comparison to the first ends 13 of the flow breakers 12. A flow, caused by the rotor 4, from the deflection face 14 and the flow breakers 12 toward the rotor 4 having the cutting protrusions 8 thereof can thus be reflected. Overall, the disposal, illustrated in FIG. 5, of the flow breakers 12 and of the deflection face 14 relative to the rotor 4, having the cutting protrusions thereof that revolve along the circular path 16, facilitates the formation of an energetically optimized flow in the form of a donut that reaches up to the rotor 4.

The mixing or dispersing device 1 conjointly with the drive unit 30 which has the drive 5 forms a mixing or dispersing assembly which in its entirety is identified by the reference sign 36. The mixing or dispersing device 1 in the use position is coupled to the drive 5 in order for a drive torque to be transmitted from the drive 5 to the rotor 4 by way of the transmission element 6.

For the optimized processing of mixing or dispersing material, in particular of tablets and/or medicament capsules, the mixing or dispersing device 1 and the mixing or dispersing assembly 36 having such a device are proposed. It is provided herein that the mixing or dispersing device 1 in the mixing space 3 thereof has a motor-driven rotor 4 which has at least one cutting protrusion 8 that is angled or bent upward from the base 7 of the mixing space 3, said cutting protrusion 8 having at least one blade 10. Furthermore, at least one flow breaker 12 is provided on the internal circumferential wall 11 of the mixing space 3 that surrounds the rotation axis R in such a manner that said flow breaker 12 has a profile that is tapered from the first end 12 of said flow breaker 12 that faces the base 7 toward the second end 13 of said flow breaker 12 that is opposite the first end 12. Furthermore, the deflection face 15 for deflecting mixing or dispersing material to be processed and/or liquid in the direction of the rotor 4 is provided between the internal circumferential wall 11 and the base 7 of the mixing space 3. The at least one flow breaker 12 herein is spaced apart from the base 7 of the mixing space 3 as well as from the at least one cutting protrusion 8 and from the circular path 16 on which the at least one cutting protrusion 8 is movable about the rotation axis R.

The invention claimed is:

1. A mixing or dispersing device (1) for comminuting tablets and/or medicament capsules and for dissolving the comminuted tablets and/or medicament capsules in a liquid, the device comprising a vessel (2) that has a mixing space (3), a rotor (4) in the mixing space (3) which is drivable about a rotation axis (R), and, a transmission element (6) configured to receive a drive torque and for transmitting the drive torque to the rotor (4), wherein the rotor (4) has at least one cutting protrusion (8) which is directed away from a base (7) of the mixing space (3) and angled toward the rotation axis (R) and which has at least one blade (10), wherein at least one flow breaker (12) is provided on an internal circumferential wall (11) of the mixing space (3) that surrounds the rotation axis (R), a first end (13) of the flow breaker (12) being located a first distance from the base (7) which is less than a second distance that a second end (14) of the flow breaker (12) is located from the base (7), the flow breaker (12) being tapered, as viewed in a direction perpendicular to the rotation axis (R), from a greater thickness at the first end (13) to a lesser thickness at the second end (14), wherein a deflection face (15), configured to deflect dispersing material and liquids in the direction of the rotor (4), is configured between the internal circumferential wall (11) and the base (7) of the mixing space (3), wherein the deflection face (15) has a profile that is oblique in relation to the base (7) and to the internal circumferential wall (11), and, wherein the first end (13) is axially spaced, in a direction away from the base (7), from a circular path (16) along which the at least one cutting protrusion (8) travels.

2. The mixing or dispersing device (1) as claimed in claim 1, wherein the rotor (4) has a plurality of the at least one cutting protrusion (8), wherein the cutting protrusions (8) are, in each case, disposed on an arm (9) of the rotor (4).

3. The mixing or dispersing device (1) as claimed in claim 1, wherein the mixing or dispersing device has a plurality of the at least one flow breaker (12).

4. The mixing or dispersing device (1) as claimed in claim 1, wherein the first end (13) is bent.

5. The mixing or dispersing device (1) as claimed in claim 1, wherein the at least one cutting protrusion (8) extends along an axis which is transverse to the base (7), the axis being aligned in relation to the rotation axis (R) so as to be within 5 degrees of being parallel therewith.

6. The mixing or dispersing device (1) as claimed in claim 1, wherein the deflection face (15) between the internal circumferential wall (11) and the base (7) of the mixing space (3) forms a closed uninterrupted ring about the rotation axis (R).

7. The mixing or dispersing device (1) as claimed in claim 1, wherein the first distance the first end (13) is from the base (7) is at least as large as a maximum dimension of the tablets and/or medicament capsules, that are to be processed by the mixing or dispersing device (1).

8. The mixing or dispersing device (1) as claimed in claim 1, wherein the first distance the first end (13) is from the base (7) corresponds to at least one fifth of a radius of the rotor (4).

9. The mixing or dispersing device (1) as claimed in claim 1, wherein the vessel (2) has a closure wall (19) that is opposite the base (7) of the mixing space (3), an interface (21) for a handling unit being provided on the external side (20) of said closure wall (19) that faces away from the mixing space (3).

10. The mixing or dispersing device (1) as claimed in claim 9, wherein the closure wall (19) has a filler opening (22) into the mixing space (3).

11. The mixing or dispersing device (1) as claimed in claim 1, wherein the vessel (2), on a lower side (27) thereof, has at least one support foot (28).

12. The mixing or dispersing device (1) as claimed in claim 1, wherein the transmission element (6) is a rod-shaped element (33) which is held by a diaphragm (32) forming at least part of an internal wall of the vessel (2) and which by means of the drive torque can be set in a gyrating motion such that a rod end (34) performs a gyrating motion, wherein the rod end (34) engages in a clearance (35) defined in the rotor (4) to drive the rotor (4).

13. The mixing or dispersing device (1) as claimed in claim 1, wherein radial spacing between the deflection face (15) and the rotation axis (R) of the rotor (4) is larger than radial spacing between the first end (13) and the rotation axis (R) of the rotor (4).

14. A mixing or dispersing assembly (36) having a drive unit (30) that has a drive (5) for generating the drive torque, and having at least one mixing or dispersing device (1) according to claim 1 that is coupled to the drive (5) so that the drive torque is applied to the transmission element (6).

15. The mixing or dispersing device (1) as claimed in claim 1, wherein the rotor (4) has a plurality of the at least one cutting protrusion (8), the cutting protrusions (8) being spaced apart from the rotation axis (R) of the rotor (4).

16. The mixing or dispersing device (1) as claimed in claim 3, wherein the flow breakers (12) are uniformly distributed about the rotation axis (R).

17. The mixing or dispersing device (1) as claimed in claim 1, wherein the at least one flow breaker (12) is a web (17) which protrudes into the mixing space (3) towards the rotation axis (R).

18. The mixing or dispersing device (1) as claimed in claim 1, wherein the at least one flow breaker (12) conjointly with the internal circumferential wall (11) form a materially homogeneous monolithic unit.

19. The mixing or dispersing device (1) as claimed in claim 5, wherein the axis is parallel to the rotation axis (R).

20. The mixing or dispersing device (1) as claimed in claim 1, wherein the axial spacing of the first end (13) from the circular path (16) is at least as large as a maximum dimension of the tablets and/or medicament capsules, that are to be processed by the mixing or dispersing device (1).

21. The mixing or dispersing device (1) as claimed in claim 1, wherein the axial spacing of the first end (13) from the circular path (16) corresponds to at least one fifth of the radius of the rotor (4).

22. The mixing or dispersing device (1) as claimed in claim 10, further comprising a lid (23) for releasably closing the filler opening (22).

23. The mixing or dispersing device (1) as claimed in claim 1, wherein the vessel (2), on a lower side (27) thereof, has a bayonet coupling (29).

24. The mixing or dispersing device (1) as claimed in claim 1, wherein the rotor (4) is disposed between the base (7) of the mixing space (3) and the first end (13).

25. The mixing or dispersing device (1) as claimed in claim 1, wherein the at least one flow breaker (12) is generally parallel to the rotation axis (R).

* * * * *